(12) United States Patent
Bang et al.

(10) Patent No.: US 8,023,769 B2
(45) Date of Patent: Sep. 20, 2011

(54) APPARATUS AND METHOD FOR SELECTIVELY OUTPUTING IMAGE FRAMES

(75) Inventors: You-sun Bang, Yongin-si (KR); Yun-tae Kim, Yongin-si (KR); Heui-keun Choh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1002 days.

(21) Appl. No.: 11/714,829

(22) Filed: Mar. 7, 2007

(65) Prior Publication Data

US 2007/0211962 A1 Sep. 13, 2007

(30) Foreign Application Priority Data

Mar. 10, 2006 (KR) .................. 10-2006-0022875

(51) Int. Cl.
  *G06K 9/36* (2006.01)
  *G06K 9/46* (2006.01)
  *G06K 9/66* (2006.01)
  *G06K 9/56* (2006.01)
  *G06K 9/62* (2006.01)
  *G06G 5/00* (2006.01)

(52) U.S. Cl. ........ 382/284; 382/190; 382/205; 382/224; 345/626

(58) Field of Classification Search .................. 382/284
See application file for complete search history.

(56) References Cited

U.S. PATENT DOCUMENTS

| | | | |
|---|---|---|---|
| 4,954,883 A * | 9/1990 | Belmares-Sarabis et al. | 348/584 |
| 6,298,145 B1 | 10/2001 | Zhang et al. | |
| 6,393,163 B1 | 5/2002 | Burt et al. | |
| 6,570,612 B1 * | 5/2003 | Saund et al. | 348/218.1 |
| 6,670,963 B2 * | 12/2003 | Osberger | 345/629 |
| 6,697,523 B1 * | 2/2004 | Divakaran et al. | 382/173 |
| 6,724,937 B1 | 4/2004 | Wu et al. | |
| 6,798,921 B2 * | 9/2004 | Kinjo | 382/282 |
| 6,833,845 B2 * | 12/2004 | Kitagawa et al. | 345/667 |
| 6,940,526 B2 | 9/2005 | Noda et al. | |
| 7,046,260 B2 * | 5/2006 | Frimout et al. | 345/660 |
| 7,197,493 B2 * | 3/2007 | Ashby et al. | 1/1 |
| 7,292,257 B2 * | 11/2007 | Kang et al. | 345/629 |
| 7,304,768 B2 * | 12/2007 | Takemoto et al. | 358/1.9 |
| 7,327,886 B2 * | 2/2008 | Ito | 382/190 |
| 2002/0181786 A1 * | 12/2002 | Stark et al. | 382/225 |

(Continued)

FOREIGN PATENT DOCUMENTS

JP 11-328443 A 11/1999

(Continued)

*Primary Examiner* — Bhavesh M Mehta
*Assistant Examiner* — Michelle Entezari
(74) *Attorney, Agent, or Firm* — Sughrue Mion, PLLC

(57) ABSTRACT

An apparatus and method for selectively outputting image frames are provided. The apparatus includes a main topic frame extractor which extracts a main topic frame, which expresses a main topic selected by a user, from continuous image frames; a composite image frame creator which extracts a key object to realize the main topic from the main topic frames, and estimates a background object with respect to the key object to create a composite image frame using the key object and the background object; a wide-angle image frame creator which creates a wide-angle image frame, which includes the composite image frame and an image frame having common information to the composite image frame, among the continuous image frames; an attractive region setting unit which sets an attractive region with respect to the wide-angle image frame; and an output unit which outputs the attractive region.

15 Claims, 4 Drawing Sheets

U.S. PATENT DOCUMENTS

| | | | |
|---|---|---|---|
| 2004/0022453 A1* | 2/2004 | Kusama et al. | 382/284 |
| 2004/0028259 A1* | 2/2004 | Kondo et al. | 382/107 |
| 2005/0219587 A1* | 10/2005 | Hayaishi | 358/1.9 |
| 2007/0168315 A1* | 7/2007 | Covannon et al. | 707/1 |

FOREIGN PATENT DOCUMENTS

| | | |
|---|---|---|
| JP | 2003-61034 A | 2/2003 |
| KR | 2004-1300 A | 1/2004 |
| KR | 2005-76258 A | 7/2005 |

* cited by examiner

APPARATUS AND METHOD FOR SELECTIVELY OUTPUTTING IMAGE FRAMES

CROSS-REFERENCE TO RELATED APPLICATION

This application claims priority from Korean Patent Application No. 10-2006-0022875 filed on Mar. 10, 2006 in the Korean Intellectual Property Office, the disclosure of which is incorporated herein by reference in its entirety.

BACKGROUND OF THE INVENTION

1. Field of the Invention

An apparatus and method consistent with the present invention relate to selectively outputting image frames, and more particularly, an apparatus and method for selectively outputting image frames, which can create a wide-angle image frame emphasizing a main topic which a user selects from continuous image frames, and select and output regions, which a user is interested in, from the wide-angle image frame.

2. Description of the Prior Art

Generally, in order to accurately reproduce the color of an image created by a source device in an output device, color enhancement technology, which enhances brightness, saturation, and hue of the image, is used in an output apparatus. Such color enhancement technology can be applied to an output consisting of moving pictures. Recently, the interest has increased in the output of moving pictures and the corresponding technologies for outputting high-definition moving pictures.

In the conventional art, U.S. Pat. No. 6,298,145 discloses technology for automatically extracting an image frame adjustably printed by using a face detector, a blurring detector, or a motion analyzer. U.S. Pat. No. 6,393,163 discloses technology for correcting and displaying mosaic images so as to be adjusted for a display system after the mosaic images are created using common displaying information. U.S. Pat. No. 6,724,937 discloses technology for determining image frames, which calculates the value of a single scalar gradient showing characteristic of each frame from continuous image frames, and seeks a gradient peak from smoothing data. U.S. Pat. No. 6,940,526 discloses technology for selecting and composing two images after deciding a boundary by composing a background image and a main image.

The conventional arts as described above merely refer to technologies for extracting a key frame in order to output moving pictures, compose different image frames, or create mosaic images.

Therefore, there is a problem in that the conventional arts do not reflect a user's demands for the output of images.

Specifically, the conventional arts do not contain technology for selectively outputting a topic that interests a user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, an aspect of the present invention provides an apparatus and method for selectively outputting image frames, which allows a user to select a main topic he/she is interested in from continuous frames, and creating a wide-angle image frame comprised of image frames to which the main topic is reflected, thereby processing and outputting only the image in the region selected by the user.

According to another aspect of the present invention, there is provided an apparatus which selectively outputs image frames, the apparatus including a main topic frame extractor which extracts a main topic frame, which expresses a main topic selected by a user, from continuous image frames; a composite image frame creator which extracts a key object to realize the main topic from the main topic frames, and estimates a background object with respect to the key object by using peripheral frame sequentially adjacent to the main topic frame, so as to create a composite image frame using the key object and the background object; a wide-angle image frame creator which creates a wide-angle image frame, which includes the composite image frame and an image frame having common information to the composite image frame, among the continuous image frames; an attractive region setting unit which sets an attractive region with respect to the wide-angle image frame; and an output unit which outputs the attractive region.

According to another aspect of the present invention, there is provided a method of selectively outputting image frames, the method including extracting a main topic frame, which expresses a main topic selected by a user, from continuous image frames; extracting a key object, which realizes the main topic, from the main topic frames, and estimating a background object with respect to the key object by using peripheral frames sequentially adjacent to the main topic frame, so as to create a composite image frame by using the key object and the background object; creating a wide-angle image frame including the composite image frame and an image frame having common information to the composite image frame, among the continuous image frames; setting an attractive region with respect to the wide-angle image; and outputting the attractive region.

BRIEF DESCRIPTION OF THE DRAWINGS

The above and other aspects of the present invention will be more apparent from the following detailed description taken in conjunction with the accompanying drawings, in which.

DETAILED DESCRIPTION OF THE EXEMPLARY EMBODIMENTS

Figure 1:
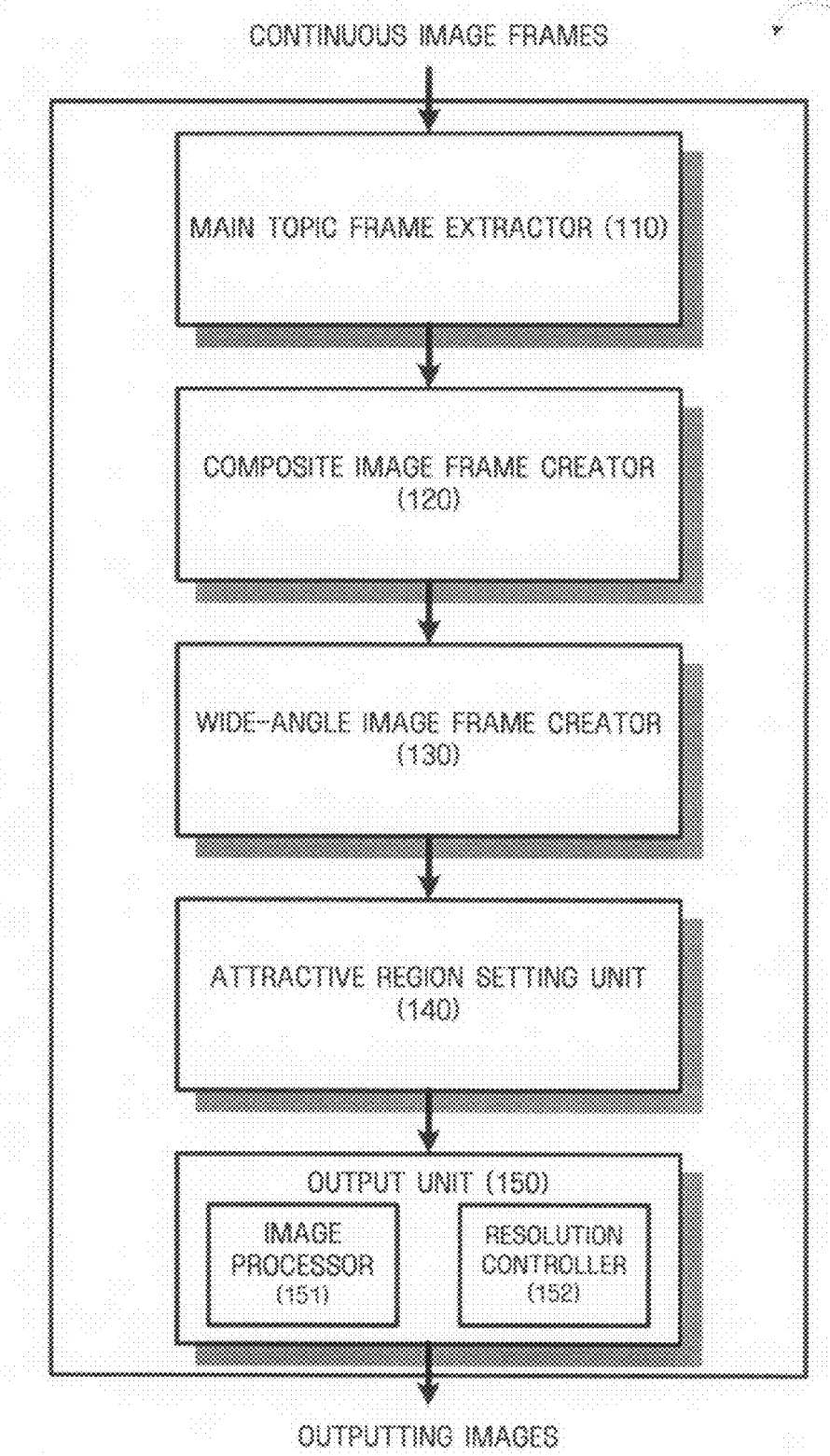
FIG. 1 is a block diagram illustrating the entire configuration of an apparatus for selectively outputting image frames according to an exemplary embodiment of the present invention.

Details of additional embodiments are included in the detailed description and drawings.

Various aspects of the present invention will now be described more fully with reference to the accompanying drawings, in which exemplary embodiments of the invention are shown. However, the scope of the present invention is not limited to such exemplary embodiments and the present invention may be realized in various forms. The exemplary embodiments described below are provided to properly disclose the present invention and assist those skilled in the art to understand the present invention. The present invention is defined only by the scope of the appended claims. Also, the same reference numerals are used to designate the same elements throughout the specification.

Hereinafter, an apparatus and a method for selectively outputting image frames according to the exemplary embodiments will be described with reference to block diagrams and flowcharts in the accompanying drawings.

FIG. 1 is a block diagram illustrating the entire configuration of the apparatus for selectively outputting image frames according to an exemplary embodiment. Referring to FIG. 1, the apparatus 100 for selectively outputting the image frames includes a main topic frame extractor 110, a composite image frame creator 120, a wide-angle image frame creator 130, an attractive region setting unit 140 for setting an attractive region in the wide-angle image frame, and an image output unit 150 provided with an image processor 151 and a resolution controller 152.

First, when a user selects a main topic, which is to be preponderantly output, from continuous image frames, the main topic frame extractor 110 extracts the main topic frame which has the selected main topic reflected in a ratio exceeding a reference ratio, from the continuous image frame.

Here, the main topic may be selected from the entire content expressed in the continuous image frames, and may particularly include a portrait topic expressing a human, a landscape topic expressing a scene of nature, etc. a structure topic expressing buildings or houses in a civic center, and an animal topic showing animals. For example, when the portrait topic has been selected by a user as the main topic, it is possible to determine a reflection ratio of the portrait topic to the main topic, based on a ratio of an area occupied by a skin color of the human in the image frame in which the object expressing the portrait topic is displayed.

A frame in which the reflection ratio of the portrait topic is greater than the reference ratio can be extracted as a main topic frame. The reference ratio may be a threshold of the area ratio that a key object (for example, portrait object exemplary expressed above) having a highest reflection ratio of the main topic among objects expressed in the main topic frame occupies, or a threshold of the color ratio that the skin color of the portrait object occupies.

For example, if the user selects the portrait topic as the main topic from the sequence of the continuous image frames in which landscapes and portraits are mixed, a face color and a face area of the selected human are calculated so that the image frames, which have a greater face area than the threshold value or a larger face color than the threshold value, are extracted among the continuous image frames as the main topic frame. To the contrary, if a frame relating to the landscape is selected as the main topic, the image frame in which the area or the color of the face region has the smallest proportion is extracted from the continuous image frames as the main topic frame.

In order to extract the main topic frame, the threshold value is set by using a cost function set in a unit block having a set size, and then the area or the color of the object expressed in the image frame can be estimated while increasing the size of a window by using an image masking method. In view of the area or the color of the estimated object, the main topic frame need not be a single frame. If the reflection ratio of the main topic is greater than the threshold value, plural frames can be set as the main topic frame.

After the main topic frame is extracted, a composite image frame creator 120 extracts the key object from the main topic frame and then estimates a background object relating to the key object by using peripheral frames sequentially adjacent to the main topic frame. Further, the composite image frame creator 120 creates a novel composite image frame by using the key object and the background object. Hereinafter, the creation of the novel composite image frame will be described with reference to FIG. 2.

Figure 2:
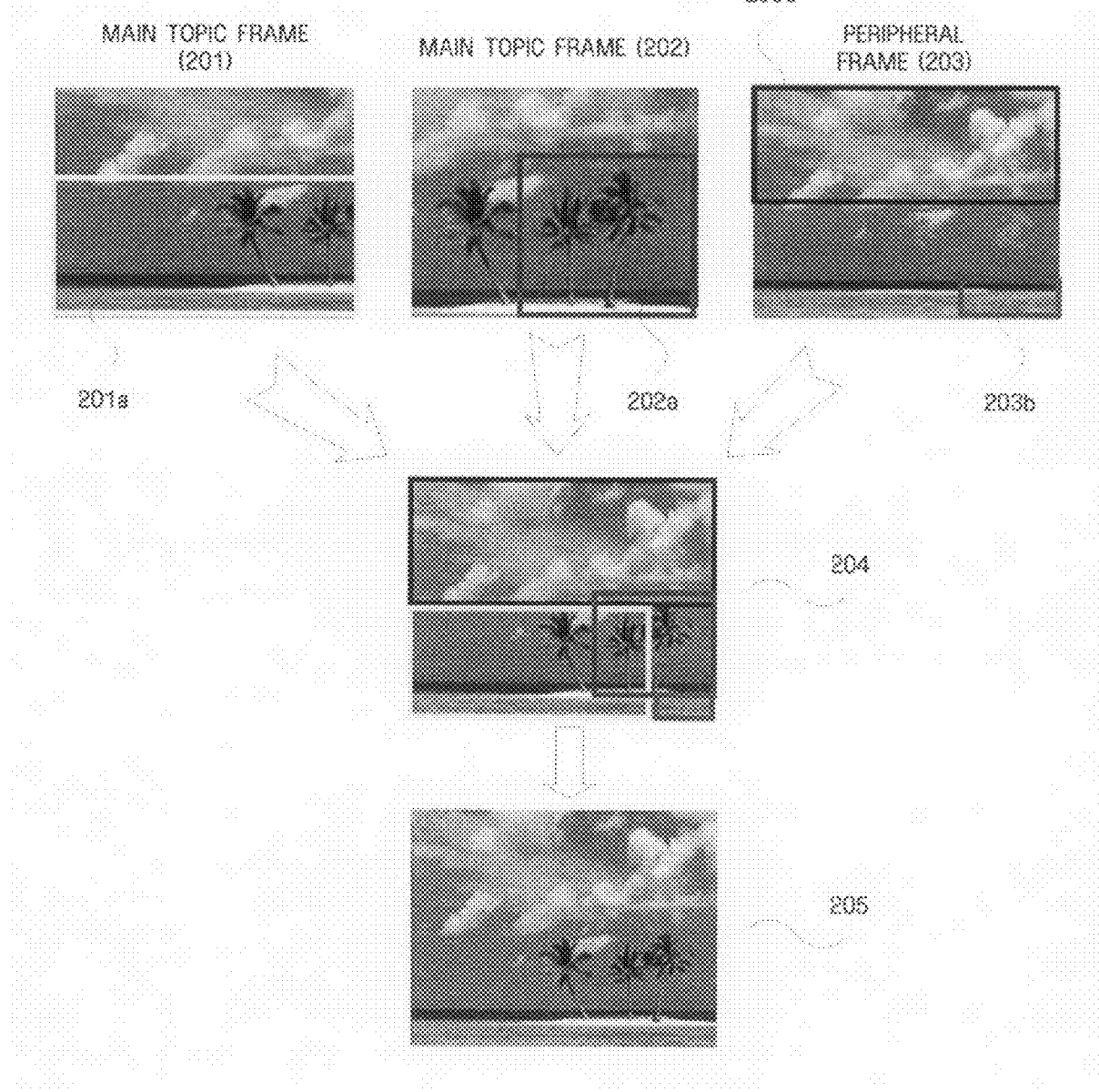
FIG. 2 is a view illustrating processes for creating a composite image frame according to the exemplary embodiment of the present invention.

FIG. 2 is a view illustrating processes for creating the composite image frame according to an exemplary embodiment of the present invention. Referring to FIG. 2, assuming that trees on an island in a sea is selected as the main topic, the key object and the background object are respectively extracted by using the main topic frames 201 and 202, and a peripheral frame 203 sequentially adjacent to the two main topic frames 201 and 202. Specifically, the key objects, which are included in a region marked by squares 201a and 202a, are extracted from the main topic frames 201 and 202, and then the background objects included in the region marked by the squares 203a and 203b are estimated from the peripheral frame 203. Thereafter, the regions 201a and 202a, including the key objects, and the regions 203a and 203b, including the background objects, are integrated so as to create a novel composite image frames 204 and 205.

After the composite image frame is created by the above-mentioned method, a wide-angle image frame creator 130 creates an image frame having common information to the composite image frame, and a wide-angle image frame including the composite image frame, from the continuous image frames. The creation of the wide-angle frame will be described with reference to FIG. 3.

Figure 3:
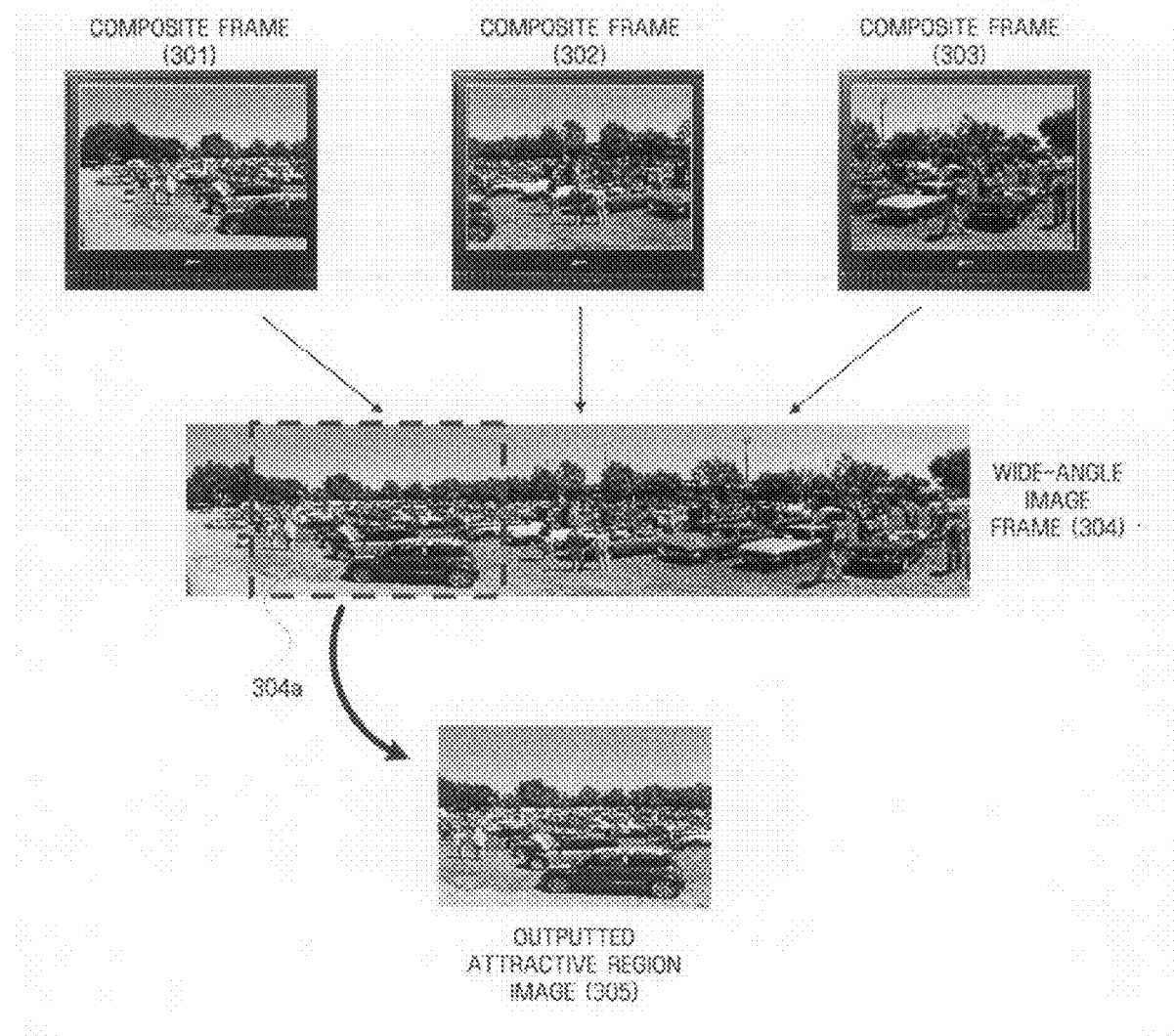
FIG. 3 is a view illustrating processes for creating a wide-angle image frame according to the exemplary embodiment of the present invention.

FIG. 3 is a view illustrating processes for creating the wide-angle image frame according to an exemplary embodiment of the present invention. Referring to FIG. 3, assuming that the appearance of vehicles is selected as a main topic, the composite frames 301, 302 and 303 respectively may become a composite image frame created by the method of FIG. 2, or a general image frame including common information sequentially and spatially adjacent to the composite image frame. If processes for creating the composite image frame are omitted and the wide-angle image frame is directly created, frames 301, 302, and 303 are regarded as the main topic frame, or the peripheral frames sequentially adjacent to the main topic frame.

In this exemplary embodiment, frame 301 is a composite image frame created by the composite image frame creator 120, and the frames 302 and 303 are an image frame including common information to the composite image frame 301, the three frames 301, 302 and 303 are interlinked to one another so as to create the wide-angle image frame 304.

In this case, in order to connect the frames 301, 302, and 303, the frames must have a relation among them. To this end, there is compared the relation between the object of the composite image frame and the object of the image frame including common information to the composite image frame. In this exemplary embodiment of the present invention, in order to determine this relation, the similarity of the area and the color of the objects are compared with one another. As a result of comparison, in the case where the similarity is greater than a desired reference, it is determined that there is a relation between the corresponding frames and, thus, it is possible to create the wide-angle image frame 304. On the other hand, in the case where the similarity is less than the desired reference, as it is determined that there is no relation between the corresponding frames, the corresponding frame is excluded from the wide-angle image frame. The reason for setting the desired reference in order to compare the relation is to prevent the wide-angle frame from appearing as an unrealistic image.

After the wide-angle image frame 304 is created by the above-mentioned method, the unit 140 for setting an attractive region sets the attractive region, which a user intents to output, in the wide-angle image frame 304. As shown in FIG. 3, the region 304a marked by a dotted line is set as the attractive region. The attractive region 304a is the portion which the user specially intends to output among the wide-angle image frames expressing the main topic set by the user, and may include the object mainly expressing the main topic. Meanwhile, the attractive region 304a may be set while the window of adjustable size and position moves on the wide-angle image frame 304 in order to set the attractive region 304a.

After the attractive region 304a is set by the above-mentioned method, the attractive region image 305 is output by the output unit 150.

Further, image processing may be carried out in order to improve the quality of image, and the resolution of the image 305 may be adjusted to be suitable for the size of the output image, before the attractive region image 305 is output. Specifically, the image processor 151 processes the image suitable to be output with respect to the attractive region. For example, in the case of selecting the portrait as the main topic, a smooth filtering may be applied to enhance the reappearance of the skin color. Further, a noise reduction algorithm may be applied to reduce noise, while an another algorithm may be applied to improve brightness, saturation, and contrast.

Furthermore, a resolution controller 152 can control the resolution with respect to the attractive region in which the image is processed. For example, when an image having a size of 4 inch×6 inch is about to be output as an image with the resolution of 600 dpi (dot per inch), the image is converted into an image with the resolution of 2400×3600 pixel size. An image interpolation or a super resolution can be used as a method for increasing the resolution.

Hereinafter, the word "unit" used in the exemplary embodiments of the present invention as shown in FIG. 1 may include a hardware structural element such as software, Field Programmable Gate Arrays or Application Specific Integrated Circuits (ASIC), which carry out specified functions. However, the unit is not limited to those. The structural elements may be stored in a storage medium to be reproduced on one or more processors. Thus, as an example, the structural elements include structural elements such as software structural elements, object-oriented software structural elements, class structural elements, and task structural elements, processes, functions, properties, procedures, sub-routines, segments of a program code, drivers, firmware, microcode, circuits, data, databases, data structures, tables, arrays, and parameters. Function provided by the structural elements may be integrated by a small amount of structural elements, or separated into additional structural elements. Further, the structural elements are realized so as to reproduce one or more CPUs in the device.

Figure 4:
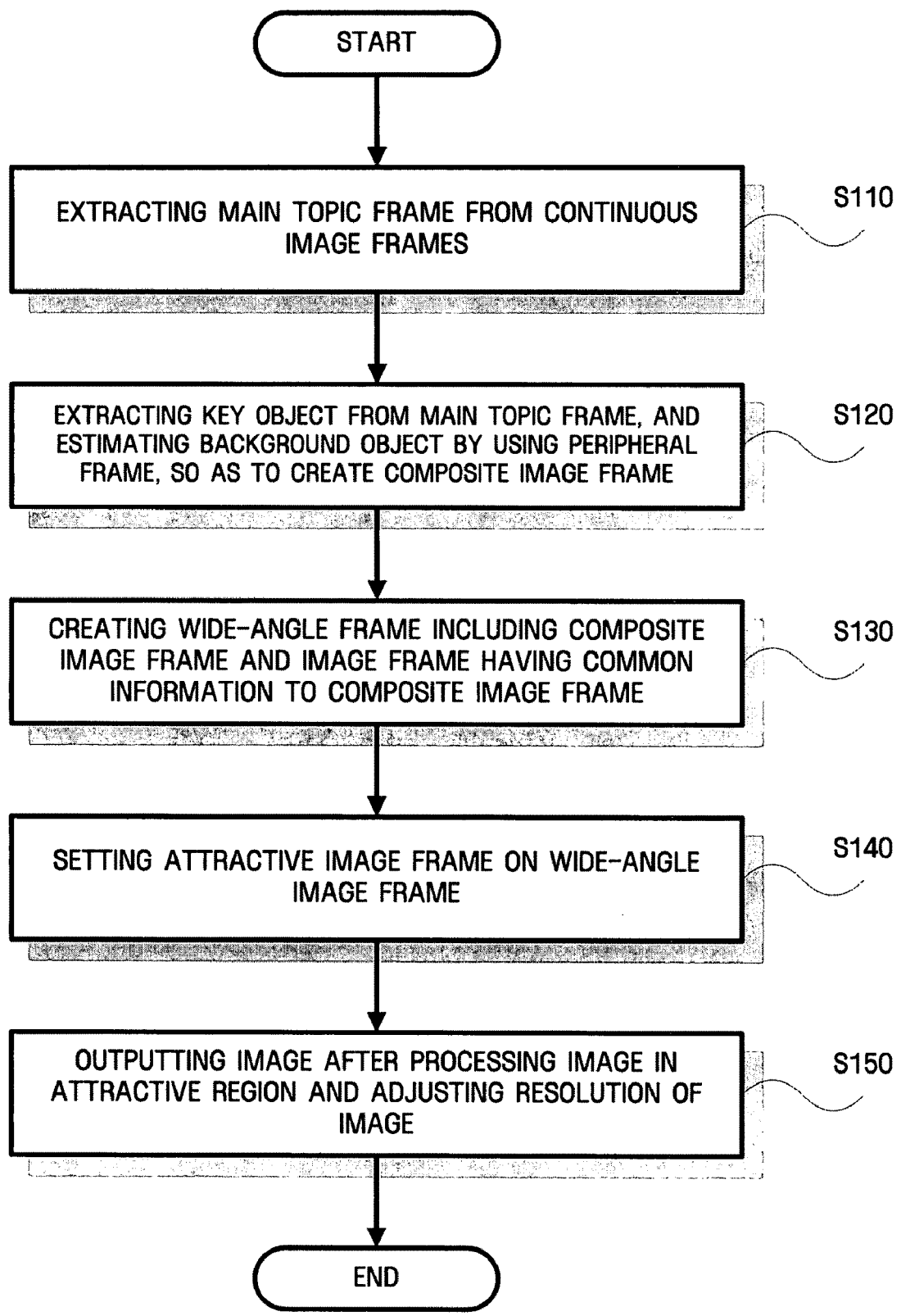
FIG. 4 is a flowchart illustrating processes for selectively outputting image frames according to the exemplary embodiment of the present invention.

Hereinafter, the entire sequential processes carried out according to an exemplary embodiment of the present invention will be described with reference to FIG. 4. FIG. 4 is a flowchart illustrating processes for selectively outputting image frames.

First, the main topic frame extractor 110 extracts the main topic frame in which the reflection ratio of the main topic selected by the user is greater than the desired reference ratio from continuous image frames S110. Then, the composite image frame creator 120 extracts the key object expressing the main topic from the main topic frame, and estimates a background object with respect to the key object by using peripheral frames sequentially adjacent to the main topic frame, thereby creating the composite image frame using the key object and the background object S120.

Next, the wide-angle image frame creator 130 creates the image frame having common information to the composite image frame, and the wide-angle image frame including the composite image frame, from the continuous image frames S130. In this case, the area and color of the object of the composite image frame are compared with those of the object of the image frame including the common information to the composite image frame in order to determine if they have similarity. As the result of comparison, if the similarity is greater than the desired reference, the wide-angle image frame can be created.

The attractive region setting unit 140 carries out setting of the attractive region with relation to the wide-angle image frame S140, and sets the attractive region on the wide-angle image frame by using a window capable of adjusting a location and a size of the attractive region.

The output unit 150 performs outputting the attractive region S150. At this time, the image processor 151 carries out the image processing suitable for outputting the attractive region, and the resolution controller 152 can adjust the resolution with respect to the attractive region which is image-processed.

The exemplary embodiments of the present invention can be applied to hardcopy output apparatuses such as color laser printers, photo printers, inkjet printers, and color multi-functional printers, softcopy output apparatuses such as plasma display panels (PDPs), liquid crystal displays (LCDs), and mobile display devices, and image storage and output apparatuses such image processing software, etc.

It would be obvious to persons killed in this art that the scope of the device for selectively outputting of the image frame according to the present invention pertains to computer-readable recording media having program code recorded in order to carry out the above-mentioned method in a computer.

According to the exemplary embodiment of the present invention, the main topic frame, which reflects the best main topic set by the user among the image frames of the continuously photographed moving pictures, is detected. Then, the images are integrated based on the detected main topic frame so as to constitute the wide-angle image frame centered around the object, which reflects the main topic well, so that the user selects and outputs the attractive region, and thereby it is possible to optimize a topic and region that a user is interested in, and to output a high quality of images during the output of the moving pictures.

The effects of the present invention are not limited to the above-mentioned effects, and other effects, which are not mentioned, will be apparent to a person skilled in the art.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for selectively outputting image frames, comprising:
   a main topic frame extractor which extracts a main topic frame, which expresses a main topic selected by a user, from continuous image frames;

a composite image frame creator which extracts a key object to realize the main topic from the main topic frame, and extracts a background object with respect to the key object from a peripheral frame sequentially adjacent to the main topic frame to create a composite image frame using the key object and the background object;

a wide-angle image frame creator which creates a wide-angle image frame, which comprises the composite image frame and an image frame having common information with the composite image frame, among the continuous image frames;

an attractive region setting unit which sets an attractive region with respect to the wide-angle image frame; and an output unit which outputs the attractive region, wherein in order to extract the main topic frame, a threshold value is set by using a cost function set in a unit block having a set size, and then an area or a color of the object expressed in the image frame can be estimated while increasing a size of a window by using an image masking method.

2. The apparatus of claim 1, wherein the output unit comprises an image processor which processes an image suitable for outputting with respect to the attractive region, and a resolution controller which adjusts a resolution of the image suitable for outputting.

3. The apparatus of claim 1, wherein the main topic is selected by the user from content expressed by the continuous image frames, and comprises at least one of a portrait topic, a landscape topic, an animal topic, and a structure topic.

4. The apparatus of claim 1, wherein the main topic frame extractor extracts the main topic frame based on a comparison of an area ratio or a color ratio of the key object to a reference ratio.

5. The apparatus of claim 1, wherein the wide-angle image frame creator creates the wide-angled image frame based on a comparison of an area and a color of an object of the composite image frame with those of an object of the image frame including common information to the composite image frame to determine if there is a similarity between the image frame and the composite image frame, wherein if the similarity is greater than a set reference similarity, the composite image frame is interlinked to the image frame, so as to create the wide-angle image frame.

6. The apparatus of claim 1, wherein the attractive region setting unit sets the attractive region on the wide-angle image frame using a window configured to adjust a location and a size of the attractive region.

7. The apparatus of claim 2, wherein the image processor processes the image suitable for outputting by filtering or carrying out a noise reduction algorithm on the images in order to improve the quality of the image depending on characteristics of the attractive region.

8. A method of selectively outputting image frames, comprising:

(a) extracting a main topic frame, which expresses a main topic selected by a user, from continuous image frames;

(b) extracting a key object, which realizes the main topic, from the main topic frame, and extracting a background object with respect to the key object from a peripheral frame sequentially adjacent to the main topic frame to create a composite image frame by using the key object and the background object;

(c) creating a wide-angle image frame including the composite image frame and an image frame having common information with the composite image frame, among the continuous image frames;

(d) setting an attractive region with respect to the wide-angle image; and (e) outputting the attractive region, wherein in order to extract the main topic frame, a threshold value is set by using a cost function set in a unit block having a set size, and then an area or a color of the object expressed in the image frame can be estimated while increasing a size of a window by using an image masking method.

9. The method of claim 8, wherein (e) comprises (e1) processing an image suitable for outputting with respect to the attractive region, and (e2) adjusting a resolution of the image suitable for outputting.

10. The method of claim 8, wherein the main topic is selected by the user from content expressed by the continuous image frames, and comprises at least one of a portrait topic, a landscape topic, an animal topic, and a structure topic.

11. The method of claim 8, wherein (a) comprises extracting the main topic frame based on a comparison of an area ratio or a color ratio of the key object to a reference ratio.

12. The method of claim 8, wherein in (c) the wide-angle frame is created by comparing an area and a color of an object of the composite image frame with those of an object of the image frame including common information to the composite image frame to determine if there is a similarity between the image frame and the composite image frame, wherein if the similarity is greater than a set reference similarity, the composite image frame is interlinked to the image frame so as to create the wide-angle image frame.

13. The method of claim 8, wherein (d) comprises setting the attractive region on the wide-angle image frame using a window configured to adjust a location and a size of the attractive region.

14. The method of claim 9, wherein (e1) comprises filtering images in order to improve a quality of the image depending on characteristics of the attractive region, or carrying out a noise reduction algorithm.

15. A non-transitory computer-readable medium having program code for carrying out the method of claim 8 in a computer.

* * * * *